United States Patent
Smith et al.

(10) Patent No.: US 6,367,891 B1
(45) Date of Patent: Apr. 9, 2002

(54) APPARATUS AND METHOD FOR DETERMINING DIRECTION OF LOCOMOTIVE TRAVEL DURING DYNAMIC BRAKING

(75) Inventors: Myron Lee Smith, Fairview; Stephen Matthew Pelkowski, Erie, both of PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/669,264

(22) Filed: Sep. 25, 2000

(51) Int. Cl.7 .................................................. B60T 8/86
(52) U.S. Cl. ........................... 303/125; 303/7; 303/191; 303/128
(58) Field of Search ............................ 303/7, 125, 128, 303/129, 130, 132, 134, 135, 136, 191, 192, 197, 22.6; 188/124, 158–165

(56) References Cited

U.S. PATENT DOCUMENTS

| 4,684,177 A | * | 8/1987 | Ha | 303/100 |
| 5,095,436 A | * | 3/1992 | Sato | 364/426.03 |
| 5,333,944 A | * | 8/1994 | Shirai et al. | 303/105 |
| 5,549,363 A | * | 8/1996 | Kanjo et al. | 303/7 |
| 6,282,478 B1 | * | 8/2001 | Akita | 701/70 |

* cited by examiner

Primary Examiner—Douglas C. Butler
Assistant Examiner—Devon Kramer
(74) Attorney, Agent, or Firm—Carl A. Rowold; John L. DeAngelis, Jr.; Holland & Knight LLP

(57) ABSTRACT

An apparatus for determining the direction of locomotive travel while in dynamic braking is disclosed. This direction of travel is derived from current sensors associated with the locomotive traction motors. When in the dynamic braking mode, current flows through the current sensors in a first direction when a train is traveling in the first direction and reverses the direction of flow when the train is traveling in a second direction.

6 Claims, 3 Drawing Sheets

APPARATUS AND METHOD FOR DETERMINING DIRECTION OF LOCOMOTIVE TRAVEL DURING DYNAMIC BRAKING

BACKGROUND OF THE INVENTION

The present invention is directed in general to determining the direction of locomotive travel during dynamic braking from current flow in the traction motors, and more specifically to an apparatus that uses the current flow information to update the direction of travel information stored within the locomotive control system, where one function of the locomotive control system is to prevent traction motor plugging when motoring is requested in the direction opposite to the last known direction of locomotive travel.

The DC (direct current) diesel-electric locomotive control system allows operator control of the traction motors, which provide the propulsion forces for the locomotive. These controller mechanisms typically include a throttle control handle for controlling the speed/horsepower of the locomotive or for activating the dynamic brakes, and a direction control handle (also referred to as a reverser handle) for controlling the direction of the applied propulsion forces. The throttle control handle has a series of notches (generally eight such notches) with higher numbered notches indicating the application of higher propulsive forces to increase the speed and/or horsepower of the locomotive. The lowest notch on the throttle handle is referred to as the "idle" position. In this position, no propulsion forces are applied by the traction motors. A request for "motoring" by the locomotive operator requires movement of the throttle handle to one of the notch positions while the direction control handle is in the forward or reverse position, as desired, at which time tractive forces, in proportion to the requested notch number, are applied to the locomotive wheels.

One deleterious effect of operator error is traction motor plugging. As is known in the art, generally, motor plugging occurs when a motoring call is made while the locomotive wheels are moving in a direction opposite to the direction of the motoring call, which is determined by the position of the direction handle. That is, if the locomotive is coasting backwards and the reverser handle is in the forward position when a motoring call is made, the motors will plug. Similarly, if the locomotive is coasting forward and the direction handle is in the reverse position when a motoring call is made, the motors will plug. The plugging action subjects the motors to traumatic forces and currents that can cause considerable damage and possibly destruction of the motors.

The locomotive control system is designed to obviate traction motor plugging under certain circumstances. For instance, assume the locomotive is moving in the forward direction under the influence of propulsion forces provided by the traction motors (that is, "motoring"). Movement of the throttle handle to the idle position discontinues the motoring call but the locomotive continues to coast forward. At this point, the locomotive control system, one feature of which is designed to obviate traction motor plugging, "remembers" the last direction handle position when motoring was called for (i.e., the forward position) and assumes this is the current direction of locomotive travel. The control system will not allow a motoring call in the reverse direction, because the reverse direction is opposite to the assumed or remembered forward direction of locomotive travel. In this way, the opportunity for traction motor plugging is precluded. But the control system will permit a forward motoring call because the call direction is the same as the remembered direction. To override the control system and allow a reverse call, the train must slow down to a very slow speed (e.g., in one embodiment one mile per hour) or stop before the control system lock-out mechanism is disabled. At these very slow speeds, although traction motor plugging does occur, the effects are of lesser consequence. It should be noted that the direction handle can always be physically moved; there is no mechanical lockout applied to the reverser handle. The lockout is effectuated through the controller software.

Obviously, it is an important responsibility of the locomotive operator to prevent traction motor plugging by a constant awareness of the direction of travel as compared with the direction handle position. However, various locomotive controls have been developed, including those of the prior art as discussed above and those of the present invention, as a means of protecting against operator error and consequent motor plugging.

Braking of trains, and in particular diesel-electric locomotives, is accomplished by air brakes on the locomotive and cars and by dynamic brakes. Both of these braking actions are well known in the art. In dynamic braking, the motors, driven by the moving wheels of the locomotive, act as generators and the current generated is dissipated by a bank of resistors. The resistors convert the current into heat, which in turn is dissipated by a fan-driven cooling system.

BRIEF SUMMARY OF THE INVENTION

Certain of the above mentioned difficulties associated with the plugging of locomotive traction motors can be overcome by the present invention, which relates to a novel and unobvious approach for determining the direction of locomotive travel while in dynamic braking mode. This direction information is sent to the locomotive control system for updating the travel direction information stored there, so as to prohibit a motoring call for movement in the opposite direction.

BRIEF DESCRIPTION OF THE DRAWINGS

The present invention can be more easily understood and the further advantages and uses thereof more readily apparent, when considered in view of the description of the preferred embodiments and the following figures in which.

DETAILED DESCRIPTION OF THE PREFERRED EMBODIMENTS

Figure 1:
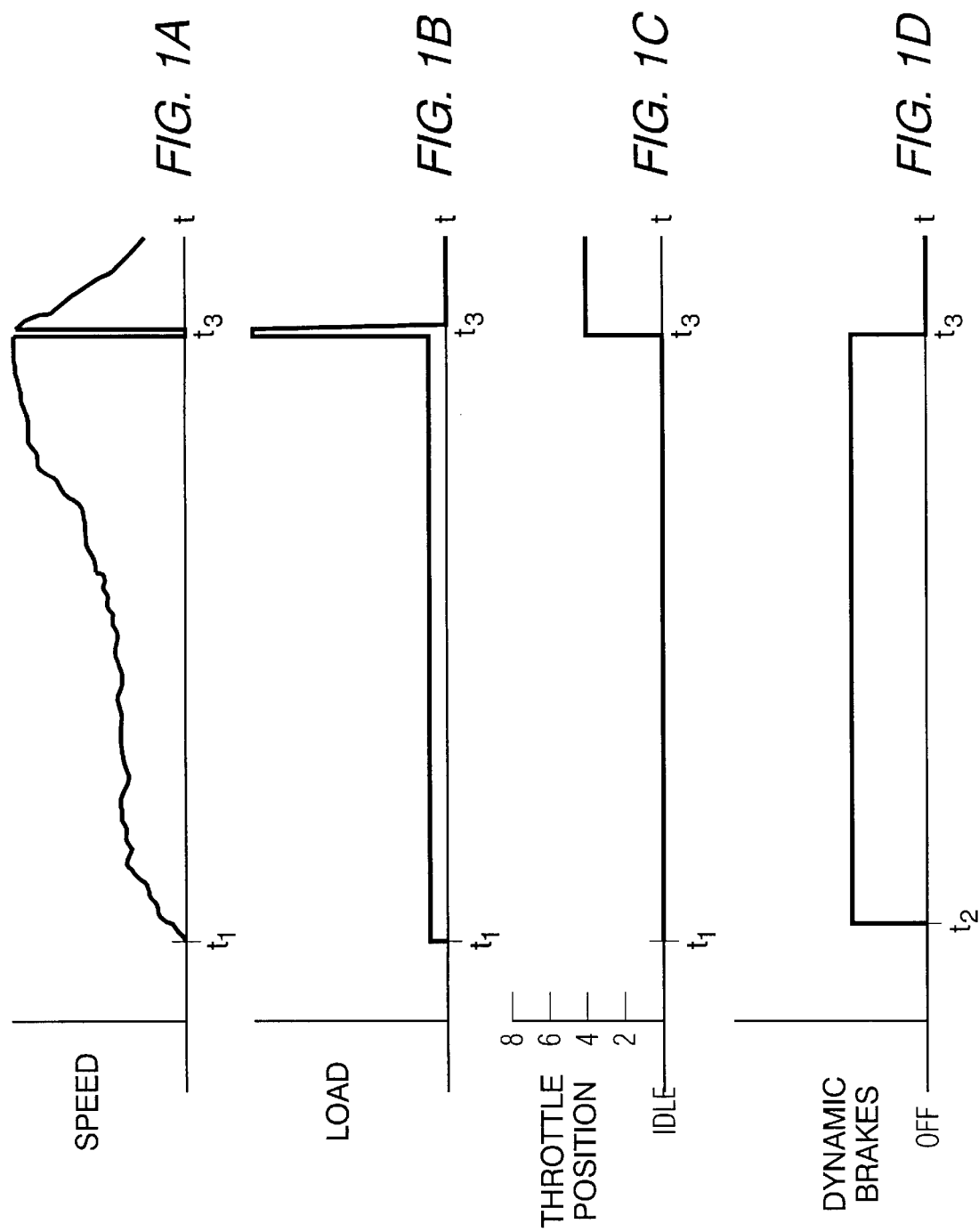
FIGS. 1A–1D are time lines showing the timing of the application of the various locomotive controls.

Before describing in detail the particular apparatus in accordance with the present invention, it should be observed that the present invention resides primarily in a novel combination of processing steps and hardware elements related to the apparatus for determining the direction of locomotive travel from the dynamic brakes and for providing this information to the locomotive control system. Accordingly, these processing steps and hardware components have been represented by conventional processes and elements in the drawings, showing only those specific details that are pertinent to the present invention, so as not to obscure the disclosure with structural details that will be readily apparent to those skilled in the art having the benefit of the description herein.

The present invention precludes traction motor plugging under circumstances where the dynamic brakes are active. Assume that the locomotive is traveling in the forward direction (forward motoring with the direction handle in the forward position) and then stops on an uphill grade. The throttle is placed into the idle position so that no traction forces are moving the wheels. Now the operator prefers to move in the reverse direction, so the locomotive is permitted to coast in reverse downhill. As the locomotive gains downhill speed, the operator applies the dynamic brakes so that the traction motors operate as generators to regulate the locomotive speed. Now, if the operator calls for motoring because he wants to accelerate in the forward (or uphill) direction, the motors will plug. Recall that the last motoring call occurred while the locomotive was traveling forward, and the current motoring call will supply propulsive forces in the forward direction. Thus, the prior art control system will not provide lock-out protection because the last "remembered" direction of travel (forward) is identical to the currently requested direction of travel. But the locomotive is in fact moving in reverse and therefore the motors will plug.

A similar scenario occurs when the locomotive moves in the reverse direction up an incline. It is then desired to move the locomotive in the forward direction down the incline. This is accomplished by allowing the locomotive to coast forward, using the dynamic brakes to control the forward speed down the grade. If the operator then calls for motoring to accelerate the locomotive in the reverse direction back up the grade, the traction motors will plug. The locomotive is moving forward while reverse motoring is requested. The prior art control system lock-out mechanism is not operative to prevent plugging because the last motoring position (reverse) is identical to the current motoring call.

FIGS. 1A–1D are time lines illustrating the various events associated with this problem. The locomotive speed is illustrated in FIG. 1A, where it is seen that prior to $t_1$, the speed was zero and the locomotive was stopped in the idle throttle position. Also, full independent air brakes are applied, although this is not shown in FIG. 1A. During the time prior to $t_1$, the locomotive controls can be set to accept a direction call in either the forward or the reverse direction. That is, the locomotive controller logic allows the operator to request either travel direction when the locomotive is not moving. Thus, a motoring call in either direction will not plug the traction motors because the motors are not moving. Also during the time preceding $t_1$, the load is zero, the throttle position is set to idle and the dynamic brakes are off. These conditions are illustrated in FIGS. 1B, 1C and 1D.

Assume that prior to $t_1$, the direction call is forward. At $t_1$, the operator releases the air brakes and the locomotive begins to accelerate in the reverse direction because the locomotive is on a sloped rail, as shown by the increase in speed in the speed graph of FIG. 1. In an effort to control that speed, the operator calls for the application of dynamic braking. Recall that although the last direction call is forward, the actual direction of travel of the locomotive is in the reverse direction.

At $t_3$, the operator calls for forward motoring, although the locomotive is traveling in the reverse direction. The "remembered" travel direction is forward, so the prior art control system will allow the forward call. See FIG. 1C. In response to the motoring call, the motors plug, the load rises to its maximum value and the speed drops to zero due to axle binding. The axles then unlock and begin to spin freely. Typically, in response to this event, the operator applies the air brakes.

Figure 2:
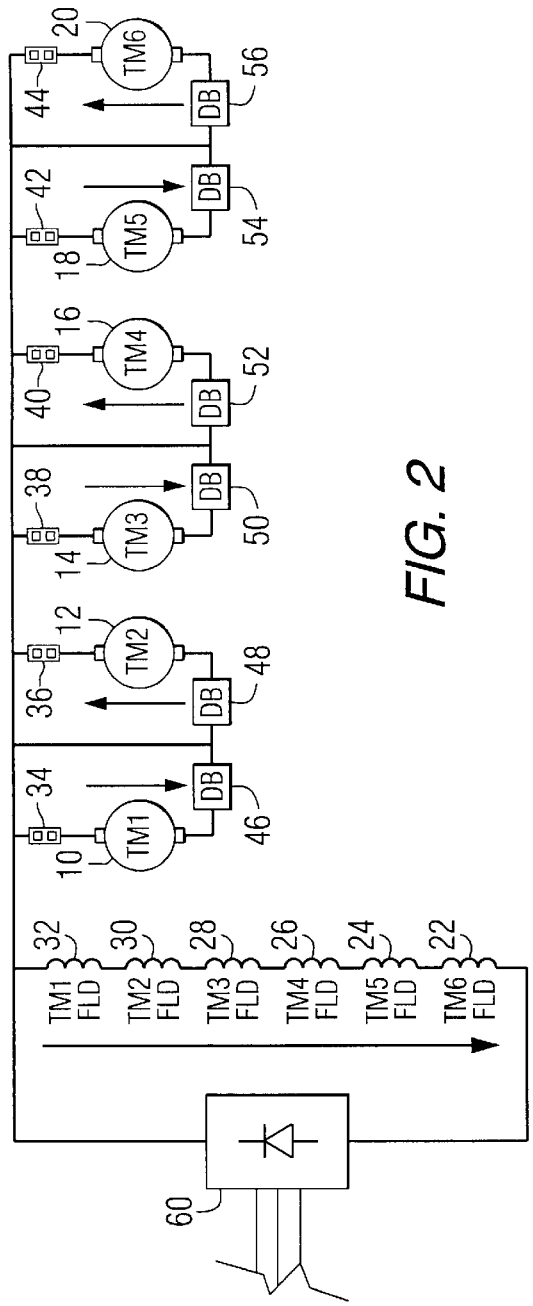
FIGS. 2 and 3 illustrate the current sensing technique associated with the dynamic braking action.
Figure 3:
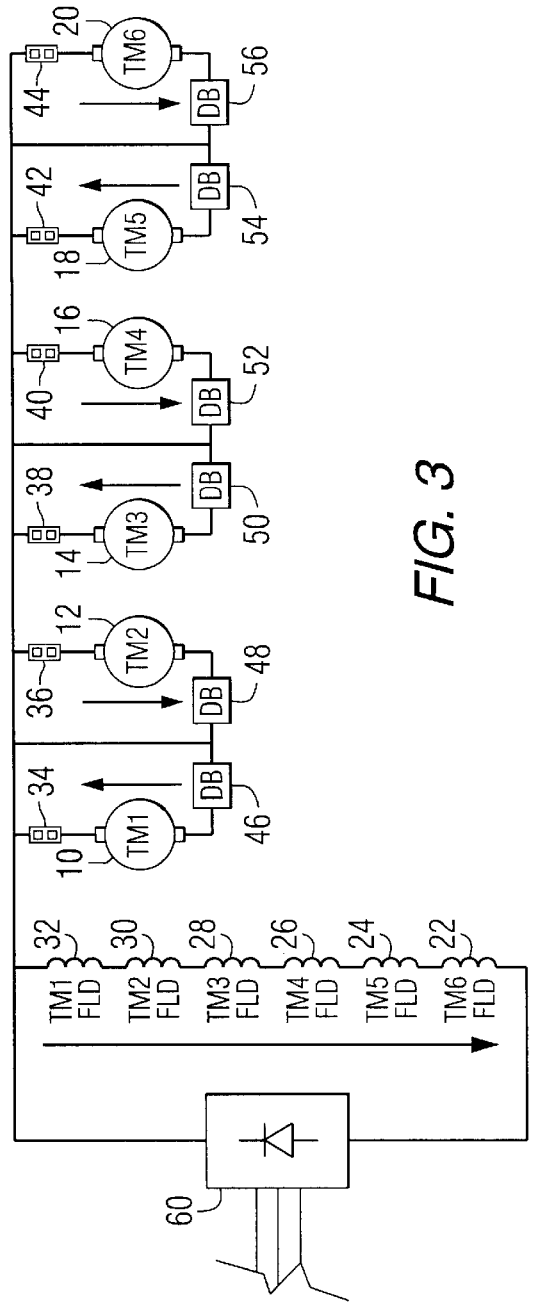

To prevent this type of operator error, the apparatus of the present invention allows transition from dynamic braking to motoring only if the direction call is the same as the actual direction of locomotive travel while in dynamic braking mode. FIGS. 2 and 3 illustrate the apparatus for determining the direction of locomotive travel while in dynamic braking mode. The actual travel direction can be supplied as an input to the locomotive control system discussed above to obviate traction motor plugging in those situations where the motoring call is preceded by dynamic braking mode and further where the direction of the motoring call is the same as the "remembered" direction but opposite to the actual travel direction, which is determined in accord with the present invention.

In FIGS. 2 and 3 identical reference character identify identical elements. The armature windings for the six traction motors are identified by reference characters 10, 12, 14, 16, 18 and 20. The field windings are identified by reference characters 22, 24, 26, 28, 30 and 32. There is one current sensor in series with the armature winding of each traction motor. The current sensors are identified by reference characters 34, 36, 38, 40, 42 and 44. Reference characters 46, 48, 50, 52, 54 and 56 identify the dynamic brake grids that dissipate power produced by the traction motors when in the dynamic braking mode. Finally, the main rectifier 60 rectifies the incoming AC voltage from the generator and applies DC voltage to the traction motors 10, 12, 14, 16, 18 and 20.

The arrows shown next to each traction motor armature indicate the current direction flowing through the current sensors 34, 36, 38, 40, 42 and 44. Note that the current direction alternates from one succeeding current sensor to the next. Note also that each current direction changes from the FIG. 2 configuration where the locomotive is traveling in a first direction, to the FIG. 3 configuration where the locomotive is traveling in a second direction. This is illustrated below.

TABLE 1

| Current Sensor: | CS34 | CS36 | CS38 | CS40 | C542 | CS44 |
|---|---|---|---|---|---|---|
| Traveling in the First Direction | | | | | | |
| Polarity: | (+) | (−) | (+) | (−) | (+) | (−) |
| Traveling in the Second Direction | | | | | | |
| Polarity: | (−) | (+) | (−) | (+) | (−) | (+) |

The output signals from one or more of the current sensors can be used singularly or combined in a majority polling arrangement to generate an output logic signal having a first value when the locomotive is traveling in the first direction (for instance the forward direction) and a second value when the locomotive is traveling in a second direction (for instance the reverse direction) while in dynamic braking mode. In one embodiment, the output signal, which represents the actual direction of travel, is then compared with the direction of the call (i.e., the position of the direction handle). If the direction of travel and the direction of call are identical, then the motoring control is enabled. If the call direction and the actual direction are not the same, the motoring control is disabled and thus the operator is prevented from plugging the traction motors.

Figure 4:
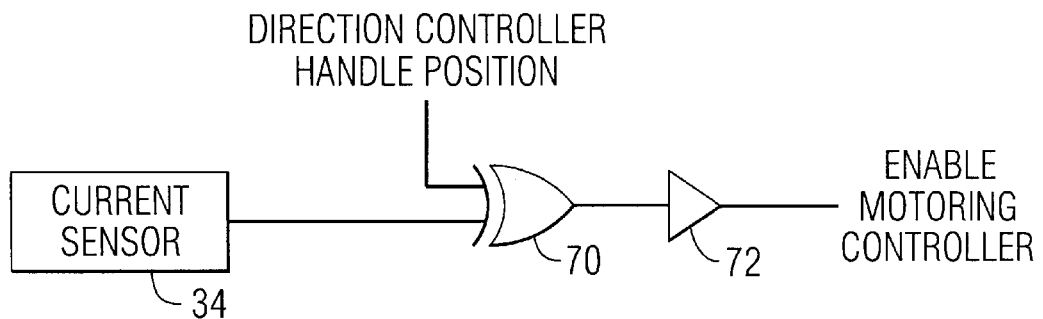
FIGS. 4 and 5 illustrate the manner in which the output from current sensors can be used to control certain locomotive controls.

One approach for controlling the motoring controller based on the output signals from the current sensors is illustrated in FIG. 4. In this embodiment, only a single current sensor (the current sensor 34) is used. Note that from Table 1, the output signal from the current sensor 34 is positive (relatively speaking) when the locomotive is traveling in the first direction and negative when the locomotive is traveling in the second direction. The current sensor can be calibrated with the direction of travel such that a positive signal indicates, for instance, travel in the forward direction. The output signal from the current sensor 34 is input to a first terminal of an EXCLUSIVE OR gate 70. The second input terminal of the EXCLUSIVE OR gate 70 is responsive to a signal representing the direction handle position. For this embodiment, it is assumed that a positive polarity signal from the direction controller handle indicates the handle is in the forward position. Further assume that a positive polarity signal from the current sensor 34 indicates the locomotive is traveling in the forward direction. If both input signals to the EXCLUSIVE OR gate 70 are high, (forward travel direction and forward handle position) the output signal will be low. If it is assumed that a positive polarity signal is required to enable motoring, the output from the EXCLUSIVE OR gate 70 is input to an inverter 72. When the locomotive is traveling in the reverse direction and the direction controller handle is in the reverse position, both input signals to the EXCLUSIVE OR gate 70 will be low, producing a low output signal, which is inverted by the inverter 72 to produce the high enable signal. If the two input terminals of the EXCLUSIVE OR gate differ in polarity, the output signal therefrom is high. The output signal from the inverter 72 is low and motoring is disabled.

In another embodiment of the present invention, two or more current direction signals can be combined by suitable logic for the purpose of generating a signal indicating the direction of locomotive travel. The resultant signal can be provided as an input to the EXCLUSIVE OR gate 70 as discussed above.

Figure 5:
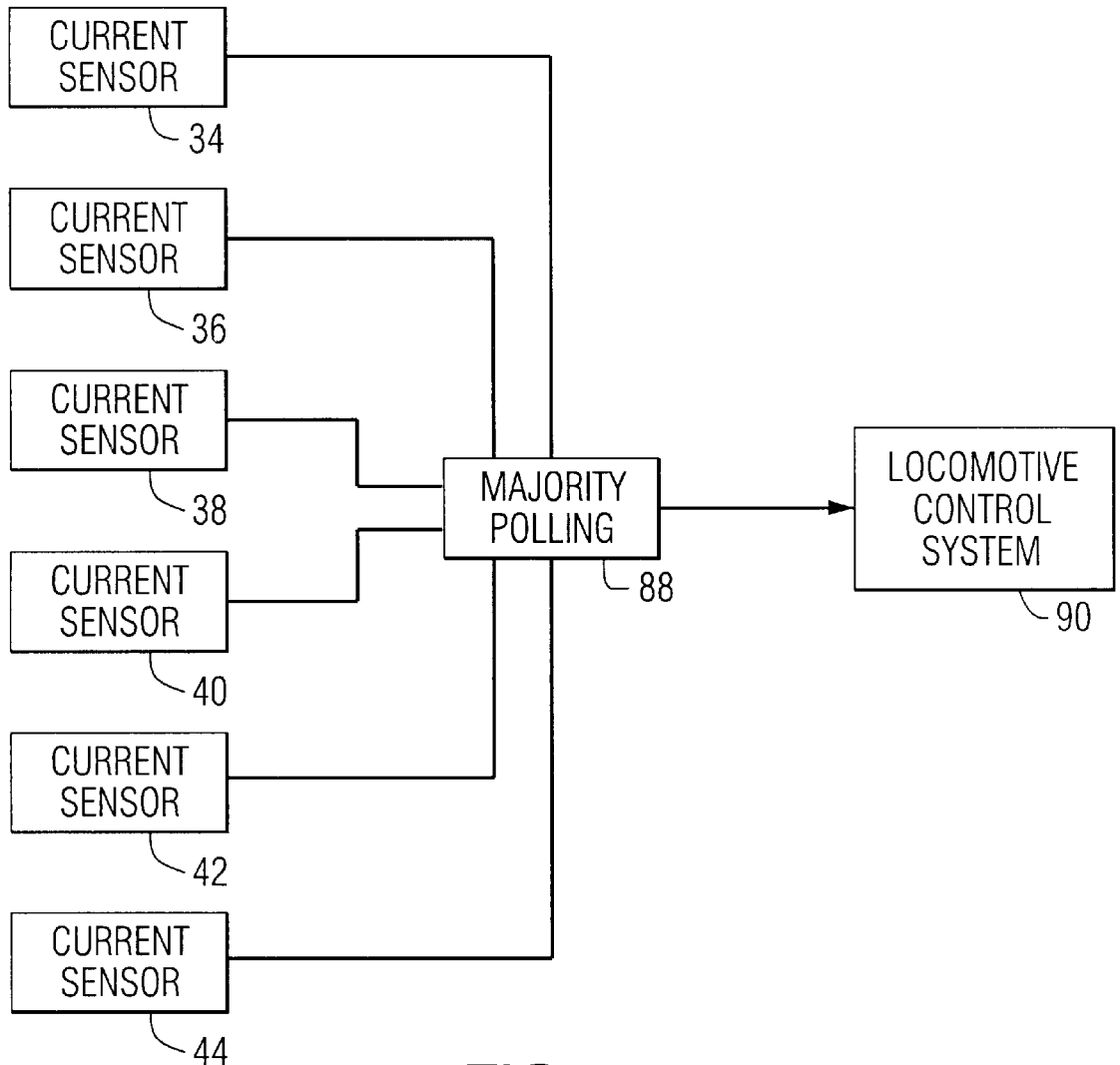

In another embodiment, direction of travel information can be supplied as an input to the locomotive control system to be stored as the so-called "remembered" direction for comparison with the requested direction for determining whether to permit the requested motoring call. Such an embodiment is illustrated in FIG. 5 where the current sensors 34, 36, 38, 40, 42 and 44 provide direction indicating information to a majority polling device 88. As is well known in the art, the majority polling device 88 can utilize any one of many schemes to determine the direction of travel from the current sensor inputs during dynamic braking. The direction of travel is input to a locomotive control system 90, where the direction is stored and used, as discussed above, as the "remembered" last direction of travel.

While the invention has been described with reference to a preferred embodiment, it will be understood by those skilled in the art that various changes may be made and equivalent elements may be substituted for elements thereof without departing from the scope of the invention. In addition, modifications may be made to adapt a particular situation more material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for controlling a railroad locomotive, wherein the locomotive includes one or more traction motors, a power source for supplying power to the one or more traction motors, and a direction handle for selecting the desired direction of locomotive travel, said apparatus comprising:

a direction sensor for determining the actual direction of locomotive travel;

a position sensor for determining the direction selected by the direction handle; and a comparator for comparing the actual direction of locomotive travel with the direction selected by the direction handle;

one or more traction motors wherein no power is supplied to the traction motors when the actual direction of locomotive travel is different from the direction selected by the direction handle.

2. The apparatus of claim 1 wherein the traction motors include dynamic brakes and wherein the direction sensor comprises at least one current sensor responsive to said dynamic brakes, wherein the direction of travel is determined by said current sensor in response to the direction of current flowing therethrough.

3. The apparatus of claim 2 wherein power is supplied to the traction motors if the actual direction of travel as determined by the current sensor is the same as the direction selected by the direction handle, and wherein no power is supplied to the traction motors if the direction of travel as determined by the current sensor is different from the direction selected by the direction handle.

4. A method for controlling operation of a railroad locomotive, wherein the locomotive comprises one or more traction motors, for receiving power from a power source to move the locomotive, and a direction handle for selecting the desired direction of locomotive travel, said method comprising:

(a) determining the actual direction of locomotive travel;

(b) determining the direction selected by the direction handle;

(c) comparing the actual direction of locomotive travel with the direction selected by the direction handle; and (d) providing power from the power source to the one or more traction motors only when the direction of locomotive travel is the same as the direction selected by the direction handle.

5. The method of claim 4 wherein the traction motors include dynamic brakes and wherein the dynamic brakes include at least one current sensor, wherein the step of determining the direction of locomotive travel comprises determining the direction of current flow through said at least one current sensor.

6. An apparatus for controlling a railroad locomotive, wherein the locomotive includes one or more traction motors, a power source for supplying power to the one or more traction motors, dynamic brakes for retarding the speed of the locomotive, and a direction handle for selecting the desired direction of locomotive travel, said apparatus comprising:

a current sensor in series with the armature winding of at least one of the one or more traction motors for determining the direction of current flowing therethrough, wherein the direction of current indicates the direction in which the traction motor is rotating while in dynamic braking mode, from which the direction of locomotive travel can be determined;

a position sensor for determining the direction selected by the direction handle; and a comparator for comparing the actual direction of locomotive travel with the direction selected by the direction handle, wherein no power is supplied to the one or more traction motors, when the actual direction of locomotive travel is different from the direction selected by the direction handle.

\* \* \* \* \*